(12) United States Patent
Jang (10) Patent No.: US 10,871,138 B2
(45) Date of Patent: Dec. 22, 2020

(54) METHOD AND APPARATUS FOR CONTROLLING MHSG FOR TORQUE ASSIST AND AIR CONDITIONER OF MILD HYBRID ELECTRIC VEHICLE

(71) Applicants: Hyundai Motor Company, Seoul (KR); KIA MOTORS CORPORATION, Seoul (KR)

(72) Inventor: Hwa Yong Jang, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 51 days.

(21) Appl. No.: 16/393,080

(22) Filed: Apr. 24, 2019

(65) Prior Publication Data

US 2019/0249636 A1    Aug. 15, 2019

Related U.S. Application Data

(63) Continuation-in-part of application No. 16/016,413, filed on Jun. 22, 2018, now abandoned.

(30) Foreign Application Priority Data

Dec. 15, 2017 (KR) .......................... 10-2017-0173618

(51) Int. Cl.
*B60W 20/00*    (2016.01)
*F02N 11/08*    (2006.01)
(Continued)

(52) U.S. Cl.
CPC ............ *F02N 11/084* (2013.01); *B60L 1/003* (2013.01); *B60L 1/02* (2013.01); *B60L 50/16* (2019.02);
(Continued)

(58) Field of Classification Search
CPC .. G06K 9/00825; G06K 9/6265; G06N 20/00; G06N 3/0454; G06N 3/084;
(Continued)

(56) References Cited

U.S. PATENT DOCUMENTS 8,560,202 B2    10/2013    Pebley et al.
2016/0159339 A1    6/2016    Cho et al.
2018/0362016 A1    12/2018    Atala et al.

FOREIGN PATENT DOCUMENTS

KR    10-1199665 B1    11/2012

OTHER PUBLICATIONS

Non-Final Office Action issued in related U.S. Appl. No. 16/016,413 dated Aug. 20, 2019.

*Primary Examiner* — Geepy Pe
*Assistant Examiner* — Tiffany P Ohman
(74) *Attorney, Agent, or Firm* — Morgan, Lewis & Bockius LLP (57) ABSTRACT

A method for controlling a mild hybrid starter & generator (MHSG) for a torque assist and an air conditioner of a mild hybrid electric vehicle according to an exemplary embodiment of the present disclosure includes setting a minimum charge amount of a first battery of the mild hybrid electric vehicle based on an outdoor temperature of the vehicle, repeating charging and discharging of the first battery by operating the MHSG so that the charge amount of the first battery is maintained at the set minimum charge amount or more, and operating the MHSG to convert power from the first battery to a second battery.

18 Claims, 8 Drawing Sheets

(51) Int. Cl.
    *B60W 20/13*    (2016.01)
    *B60L 1/02*     (2006.01)
    *B60L 50/16*    (2019.01)
    *B60L 1/00*     (2006.01)
    *B60L 58/13*    (2019.01)
(52) U.S. Cl.
    CPC .............. *B60L 58/13* (2019.02); *B60W 20/13*
        (2016.01); *B60L 2240/34* (2013.01); *B60L 2240/662* (2013.01); *F02N 11/0825* (2013.01)
(58) Field of Classification Search
    CPC .... G06N 5/046; G05D 1/0088; G05D 1/0246; G05D 2201/0213; G08G 1/00
    USPC .......................................................... 701/28
    See application file for complete search history.

| Detect a charge amount of the first battery and the outdoor temperature of the vehicle | ~S301 |

| Operate the MHSG so that the charge amount of the first battery becomes the maximum amount | ~S302 |

METHOD AND APPARATUS FOR CONTROLLING MHSG FOR TORQUE ASSIST AND AIR CONDITIONER OF MILD HYBRID ELECTRIC VEHICLE

CROSS-REFERENCE TO RELATED APPLICATION

This application is a Continuation-In-Part of U.S. patent application Ser. No. 16/016,413, filed on Jun. 22, 2018, which claims the benefit of priority to Korean Patent Application No. 10-2017-0173618, filed on Dec. 15, 2017, the disclosures of which are incorporated by reference in their entireties.

TECHNICAL FIELD

The present disclosure relates to a method and an apparatus for controlling a mild hybrid starter & generator (MHSG) for a torque assist and an air conditioner of a mild hybrid electric vehicle. More particularly, the present disclosure relates to a method and an apparatus for controlling an MHSG for a torque assist and an air conditioner of a mild hybrid electric vehicle in which an MHSG torque assist function operates according to indoor and outdoor temperatures of a mild hybrid electric vehicle and an air conditioner operation pattern of a driver.

BACKGROUND

A hybrid electric vehicle is generally known as using its power source from an internal combustion engine and a battery together. The hybrid electric vehicle efficiently combines a torque of the internal combustion engine and a torque of a motor.

The hybrid electric vehicle may be divided into a hard type and a mild type according to a power sharing ratio between the engine and the motor. In case of the mild type of hybrid electric vehicle (hereinafter referred to as a mild hybrid electric vehicle), a mild hybrid starter & generator (MHSG) configured to start the engine or generate electricity according to an output of the engine is used instead of an alternator. In the case of the hard type of hybrid electric vehicle, a driving motor for generating driving torque is used in addition to an integrated starter & generator (ISG) configured to start the engine or generate electricity.

The mild hybrid electric vehicle may assist an engine torque according to a driving state of the vehicle by using the MHSG and may charge a battery (e.g., 48V battery) through a regenerative braking. Accordingly, fuel efficiency of the mild hybrid electric vehicle may be improved.

Further, the vehicle in which the mild hybrid electric vehicle is applied has to have high fuel efficiency and improved air conditioning function during summer or when operation of the air conditioner is required. Rather than the fuel efficiency, the vehicle in which the mild hybrid electric vehicle is applied is necessary to maintain indoor air to be comfortable so that a driver does not feel discomfort. To achieve this, when the MHSG is used to provide a torque assist for satisfying the torque required by a driver, the MHSG generates electricity to charge a 48V battery and converts the electricity to a 12V battery through a low voltage DC-DC converter (LDC) at a time that charge amount (SOC) of the 48V battery is small due to the air conditioner being required to operate. However, electricity conversion efficiency becomes low such that consumption target value of the 12V battery of vehicle electrical components may not be matched. In this case, driver's complaint is expected.

The above information disclosed in this Background section is only for enhancement of understanding of the background of the invention and therefore it may contain information that does not form the prior art that is already known in this country to a person of ordinary skill in the art.

SUMMARY

Accordingly, the present disclosure has been made keeping in mind the above problems occurring in the prior art, and it is an object of the present disclosure to provide a method and an apparatus for controlling an MHSG for a torque assist and an air conditioner of a mild hybrid electric vehicle which maintains a battery charge amount above a minimum charge amount by charging batteries according to indoor and outdoor temperatures of the vehicle and an operation pattern of the air conditioner by a driver, and which prevents battery power from lacking when the air conditioner operates and keeps the indoor temperature comfortable.

A method for controlling an MHSG for a torque assist and an air conditioner of a mild hybrid electric vehicle according to an exemplary embodiment of the present disclosure may include setting, by a controller, a minimum charge amount of a first battery of the mild hybrid electric vehicle based on an outdoor temperature of the vehicle, repeating, by the controller, charging and discharging of the first battery by operating the MHSG so that the charge amount of the first battery is maintained at the set minimum charge amount or more, and operating, by the controller, the MHSG to convert power from the first battery to a second battery.

In the setting of the minimum charge amount of the first battery, the minimum charge amount of the first battery may be set by including a database of a driver's operating pattern of the air conditioner.

The database of the driver's operating pattern of the air conditioner may include a probability of whether the driver operates the air conditioner at a specific time point.

The setting of the minimum charge amount of the first battery may include an indoor temperature information of the vehicle, and the minimum charge amount of the first battery may be set based on a difference between an outdoor temperature and the indoor temperature of the vehicle.

The repeating of charging and discharging of the first battery may include detecting a charge amount of the first battery and the outdoor temperature of the vehicle, and operating the MHSG so that the charge amount of the first battery becomes a maximum amount when the charge amount of the first battery is discharged to the set minimum charge amount according to the outdoor temperature of the vehicle.

The setting of the minimum charge amount of the first battery may include setting the minimum charge amount of the first battery as a first reference charge amount when the outdoor temperature of the vehicle is less than a first reference temperature, setting the minimum charge amount of the first battery as a second reference charge amount when the outdoor temperature of the vehicle is higher than the first reference temperature and lower than a second reference temperature that is higher than the first reference temperature, and setting the minimum charge amount of the first battery as a third reference charge amount when the outdoor temperature of the vehicle is equal to or higher than the second reference temperature.

The first reference charge amount may be smaller than the second reference charge amount, and the second reference charge amount may be smaller than the third reference charge amount.

The first battery may be a 48V battery, and the second battery is a 12V battery.

In the operating of the MHSG to convert the power from the first battery to the second battery, the power generated by the MHSG may be converted from the first battery to the second battery via a low voltage DC-DC converter (LDC) so that a charge amount of the second battery is above a certain value.

Further, an apparatus for controlling an MHSG for a torque assist and an air conditioner of a mild hybrid electric vehicle according to an exemplary embodiment of the present disclosure may include a first battery charge amount detecting sensor for detecting a charge amount of a first battery, an outdoor temperature sensor for detecting an outdoor temperature of the vehicle, and a controller for controlling the charge amount of the first battery and assisting an engine torque of the vehicle, and the controller may be configured to set a minimum charge amount of the first battery based on the outdoor temperature of the vehicle, operate the MHSG to repeatedly perform charging and discharging of the first battery so that the charge amount of the first battery is maintained at the set minimum charge amount or more, and operate the MHSG to convert power from the first battery to the second battery.

The controller may be further configured to set the minimum charge amount of the first battery by including a database of a driver's operating pattern of the air conditioner.

The database of the driver's operating pattern of the air conditioner may include a probability of whether the driver operates the air conditioner at a specific time point.

The controller may be further configured to acquire information on an indoor temperature of the vehicle from an indoor temperature sensor, and set the minimum charge amount of the first battery based on a difference between the outdoor temperature and the indoor temperature of the vehicle.

The controller may be further configured to operate the MHSG so that the charge amount of the first battery becomes a maximum amount when the charge amount of the first battery is discharged to the set minimum charge amount according to the outdoor temperature of the vehicle.

The controller may be further configured to set the minimum charge amount of the first battery as a first reference charge amount when the outdoor temperature of the vehicle is less than a first reference temperature, set the minimum charge amount of the first battery as a second reference charge amount when the outdoor temperature of the vehicle is higher than the first reference temperature and lower than a second reference temperature that is higher than the first reference temperature, and set the minimum charge amount of the first battery as a third reference charge amount when the outdoor temperature of the vehicle is equal to or higher than the second reference temperature.

The first reference charge amount may be smaller than the second reference charge amount, and the second reference charge amount may be smaller than the third reference charge amount.

The first battery may be a 48V battery, and the second battery may be a 12V battery.

The controller may be further configured to convert the power generated by the MHSG from the first battery to the second battery via a low voltage DC-DC converter (LDC) so that the charge amount of the second battery is above a certain value.

As described above, according to an exemplary embodiment of the present disclosure, the method and apparatus for controlling an MHSG for a torque assist and an air conditioner of a mild hybrid electric vehicle maintains a battery charge amount above a minimum charge amount by charging batteries according to indoor and outdoor temperatures of the vehicle and an operation pattern of the driver of the air conditioner, and prevents battery power from lacking when the air conditioner operates and keeps the indoor temperature comfortable.

DETAILED DESCRIPTION

In the following detailed description, the present disclosure will be described more fully with reference to the accompanying drawings, in which exemplary embodiments of the invention are shown. However, the present disclosure is not limited the exemplary embodiments which are described herein, and may be modified in various different ways.

Parts which are not related with the description are omitted for clearly describing the exemplary embodiment of the present disclosure, and like reference numerals refer to like or similar elements throughout the specification.

Since each component in the drawings is arbitrarily illustrated for easy description, the present disclosure is not particularly limited to the components illustrated in the drawings.

Hereinafter, referring to FIG. 1 and FIG. 4, an apparatus for controlling MHSG torque assist and air conditioner of mild hybrid electric vehicle according to an exemplary embodiment of the present disclosure will be explained.

Figure 1:
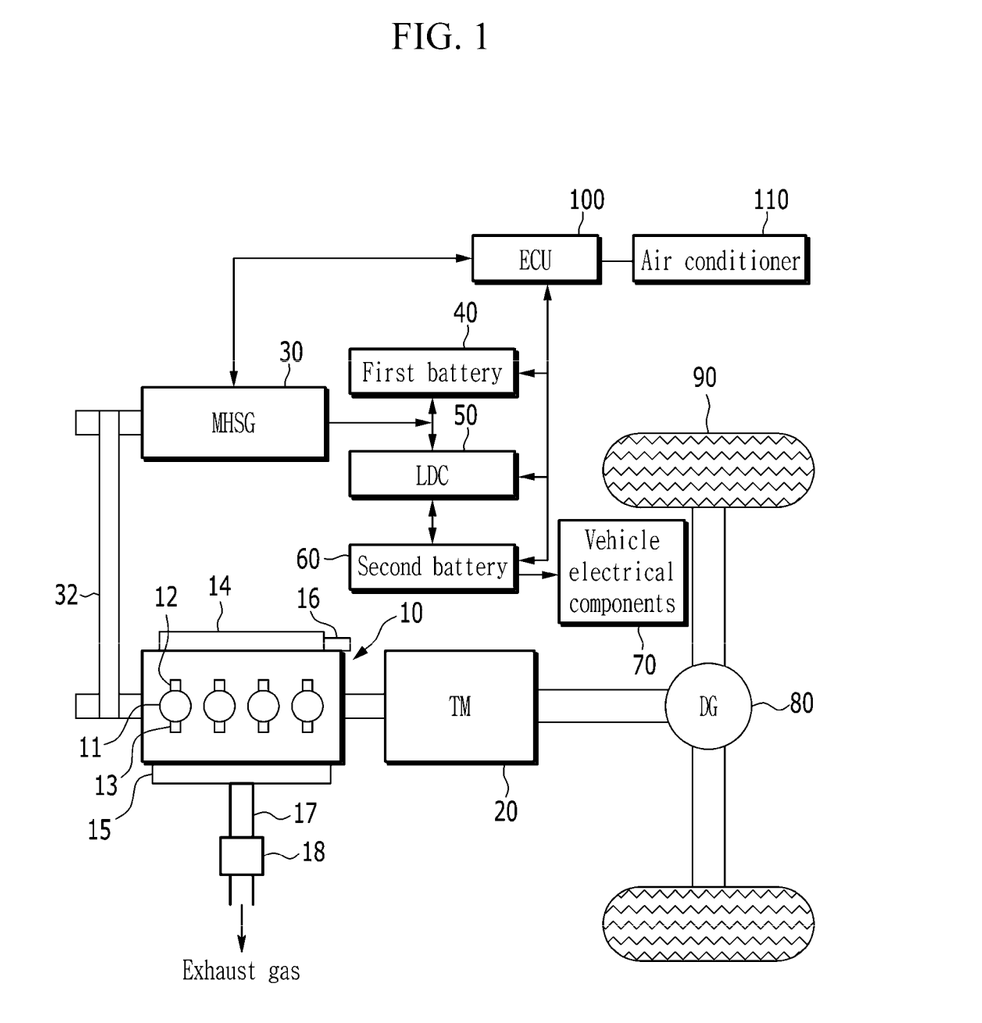
FIG. 1 is a block diagram of a mild hybrid electric vehicle according to an exemplary embodiment of the present disclosure.
Figure 4:
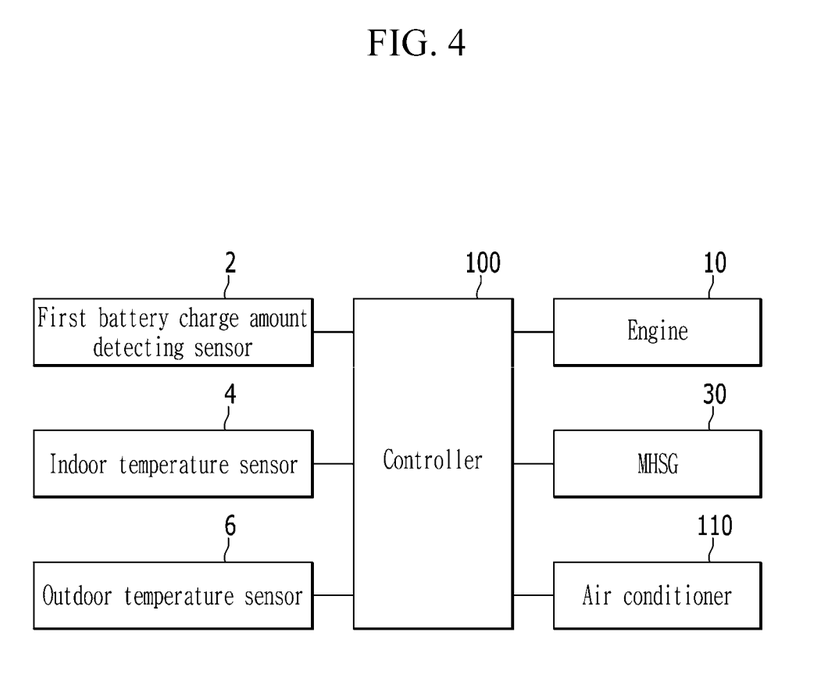
FIG. 4 is a block diagram of an apparatus for controlling MHSG torque assist and air conditioner of mild hybrid electric vehicle.

FIG. 1 is a block diagram of a mild hybrid electric vehicle according to an exemplary embodiment of the present disclosure, and FIG. 4 is a block diagram of an apparatus for controlling MHSG torque assist and air conditioner of mild hybrid electric vehicle.

As shown in FIG. 1, a mild hybrid electric vehicle according to an exemplary embodiment of the present disclosure includes an engine 10, a transmission 20, an MHSG (mild hybrid starter & generator) 30, a first battery 40, a differential gear device 80 and a wheel 90.

The engine 10 combusts fuel and air to convert chemical energy to mechanical energy.

In connection with torque transmission of the mild hybrid electric vehicle, torque generated from the engine 10 is transmitted to an input shaft of the transmission 20, and torque output from an output shaft of the transmission 20 is transmitted to an axle via the differential gear device 80. The axle rotates the wheel 90 such that the mild hybrid electric vehicle runs by the torque generated from the engine 10.

The axle rotates the wheel 90 such that the mild hybrid electric vehicle runs by the torque generated from the engine 10. That is, The MHSG 30 starts the engine 10 or generates electricity according to an output of the engine 10. In addition, the MHSG 30 may assist the torque of the engine 10. The torque of the engine 10 may be used as main torque and torque of the MHSG 30 may be used as auxiliary torque. The engine 10 and the MHSG 30 may be connected to each other through a belt 32.

The first battery 40 may supply electricity to the MHSG 30, and may be charged through electricity recovered through the MHSG 30 in a regenerative braking mode. The first battery 40 may be a 48V battery. The mild hybrid electric vehicle may further include a low voltage DC-DC converter (LDC) converting a voltage supplied from the first battery 40 into a low voltage, and a second battery 60 supplying a low voltage to electrical components 70 (e.g., a headlamp, an air conditioner, and a wiper). The second battery 60 may be a 12V battery.

The engine 10 may include a combustion chamber 11 into which fuel and air flow, an ignition device 12 igniting the fuel and the air flowing into the combustion chamber 11, and an injector 13 injecting the fuel. The engine 10 is connected to an intake manifold 14 so as to receive the air in the combustion chamber 11, and exhaust gas generated in a combustion process is gathered in an exhaust manifold 15 and is exhausted to the exterior of the engine 10. The injector 13 may be mounted in the combustion chamber 11 or the intake manifold 14. The engine 10 may include a plurality of combustion chambers 11.

A throttle valve 16 is disposed on an intake line supplying air to the intake manifold 14. Flow of air supplied to the intake manifold 14 is controlled according to an opening amount of the throttle valve 16.

The exhaust pipe 17 is connected to the exhaust manifold 15 to exhaust the exhaust gas to the exterior of the mild hybrid electric vehicle. A catalyst 18 may be mounted on the exhaust pipe 17 and remove hydrocarbons, carbon monoxide, and nitrogen oxide contained in the exhaust gas.

As shown in FIG. 4, an apparatus for controlling an MHSG for a torque assist and an air conditioner of a mild hybrid electric vehicle according to an exemplary embodiment of the present disclosure include a first battery charge amount detecting sensor 2, an indoor temperature sensor 4, an outdoor temperature sensor 6, and a controller 100.

The first charge amount detecting sensor 2 detects a charge amount of a first battery 40 and transmits the signal to the controller 100, and the indoor temperature sensor 4 and an outdoor temperature sensor 6 respectively detects the indoor temperature and the outdoor temperature of the vehicle and transmits the signal to the controller 100.

The controller 100 maintains the charge amount of the first battery 40 at a minimum charge amount or more, and controls to assist the engine 10 torque of the vehicle.

In addition, the controller 100 may set the minimum charge amount of the first battery 40 of the mild hybrid electric vehicle based on the outdoor temperature of the vehicle. In addition, the controller 100 may set the minimum charge amount of the first battery 40 by including the air conditioner operation habit database of the driver. In addition, the controller 100 may acquire information on an indoor temperature of the vehicle from an indoor temperature sensor 4 for sensing a temperature of the vehicle interior, and control to set the minimum charge amount of the first battery 40 based on the difference between the outdoor temperature and the indoor temperature of the vehicle.

After completing learning the air conditioner operation habit database of the driver, the controller 100 may control to repeat charging and discharging of the first battery 40 by operating the MHSG 30 so that the charge amount of the first battery 40 is maintained at the set minimum charge amount or more, and operate the MHSG 30 to convert power from the first battery 40 to the second battery 60 to maintain enough voltage storage amount of the second battery.

The controller 100 may be implemented with one or more processors (e.g., a CPU, etc.) and an associated non-transitory memory storing software instructions executed by the one or more processors. The software instructions may include a series of commands for performing each step included in a method for controlling MHSG torque assist time of mild hybrid electric vehicle according to an exemplary embodiment of the present disclosure to be described below.

Figure 2:
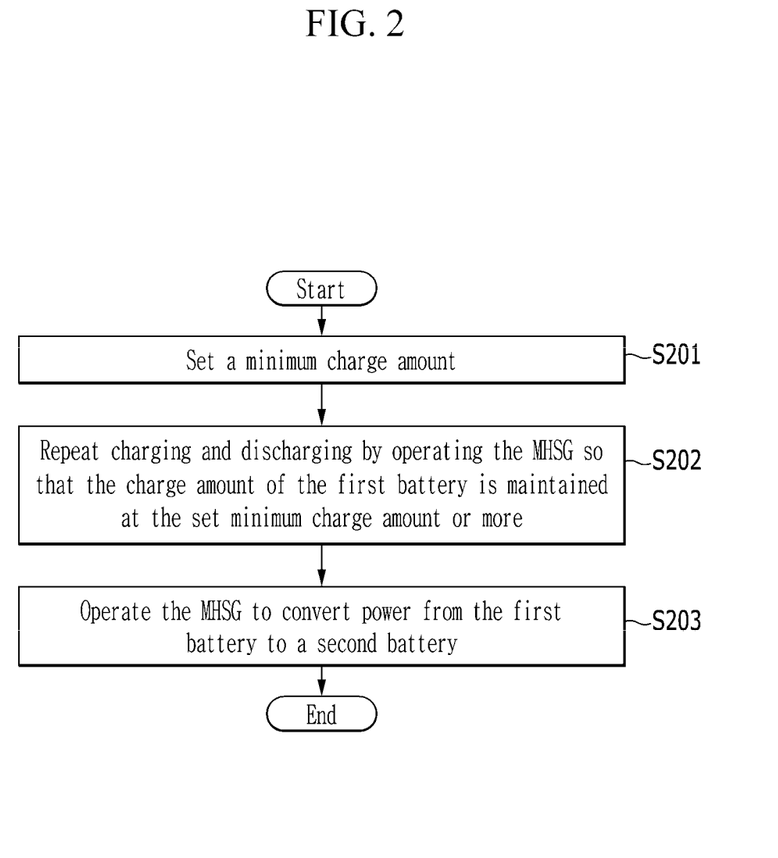
FIG. 2 is a flowchart of a method for controlling MHSG torque assist and air conditioner of mild hybrid electric vehicle according to an exemplary embodiment of the present disclosure.
Figure 3:
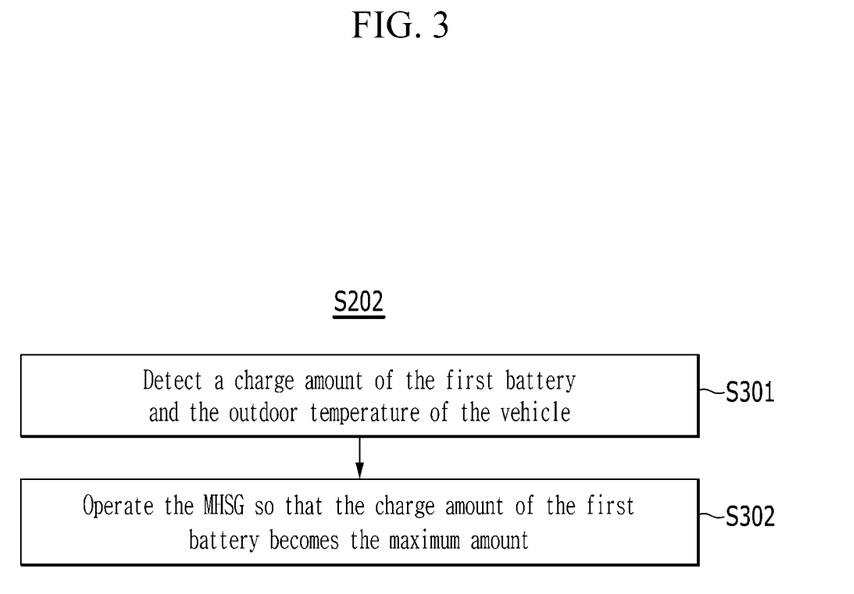
FIG. 3 is a flowchart of a method for controlling MHSG torque assist and air conditioner of mild hybrid electric vehicle according to an exemplary embodiment of the present disclosure.
Figure 5:
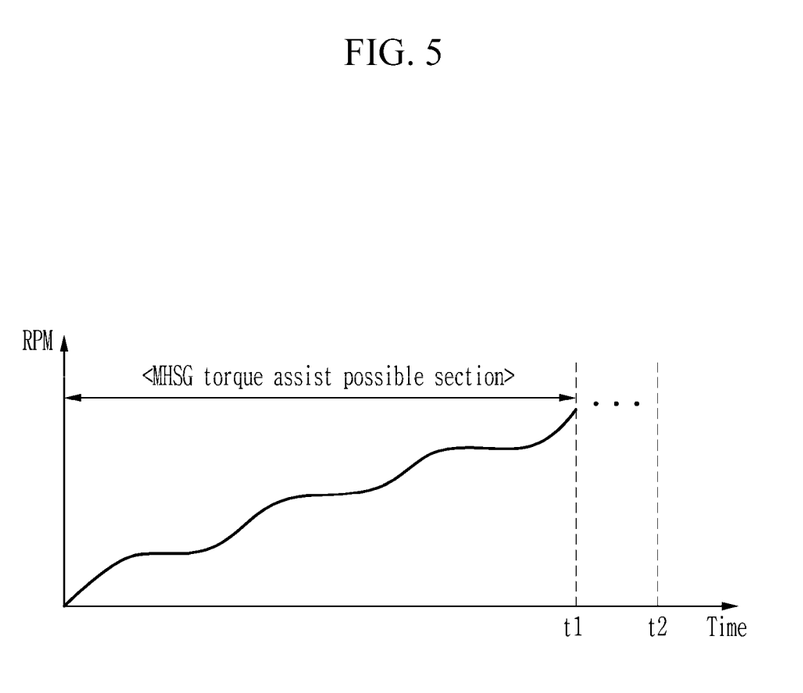
FIG. 5 is a graph illustrating learning complete time point t1 and air conditioning operation prediction time point for explaining a method for controlling MHSG torque assist and air conditioner of mild hybrid electric vehicle according to an exemplary embodiment of the present disclosure.
Figure 6A:
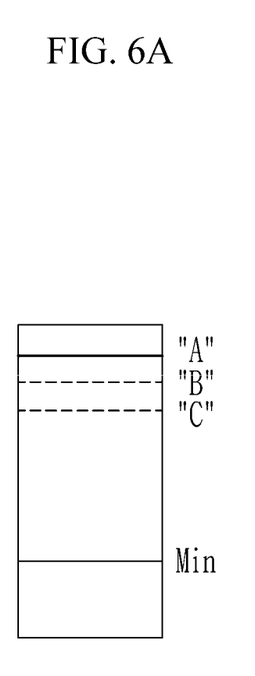
FIGS. 6A, 6B, and 6C are conceptual diagrams each illustrating a minimum charge amount of a first battery for explaining a method for controlling MHSG torque assist and air conditioner of mild hybrid electric vehicle according to an exemplary embodiment of the present disclosure.
Figure 6B:
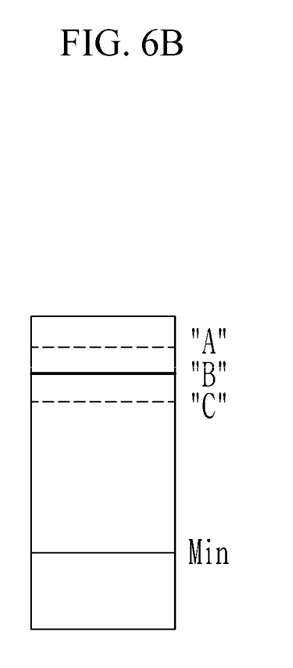
Figure 6C:
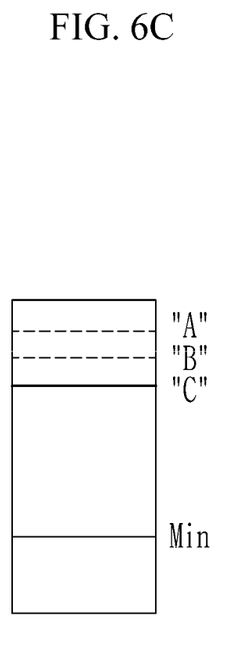

FIG. 2 and FIG. 3 are flowchart of a method for controlling MHSG torque assist and air conditioner of mild hybrid electric vehicle according to an exemplary embodiment of the present disclosure, FIG. 5 is a graph illustrating learning complete time point t1 and air conditioning operation prediction time point for explaining a method for controlling MHSG torque assist and air conditioner of mild hybrid electric vehicle according to an exemplary embodiment of the present disclosure, and FIGS. 6A, 6B, and 6C are conceptual diagrams each illustrating a minimum charge amount of a first battery for explaining a method for controlling MHSG torque assist and air conditioner of mild hybrid electric vehicle according to an exemplary embodiment of the present disclosure.

Referring to FIG. 2, FIG. 3, FIG. 5 and FIGS. 6A-6C, as a method for controlling MHSG torque assist and air conditioner of mild hybrid electric vehicle, firstly, a minimum charge amount of a first battery 40 of the mild hybrid electric vehicle is set based on the outdoor temperature of the vehicle S201. At this time, the minimum charge amount of the first battery 40 is set by including the air conditioner operation habit database of the driver. Further, an indoor temperature information of the vehicle is acquired, and the minimum charge amount of the first battery 40 is set based on the difference between the outdoor temperature and the indoor temperature of the vehicle.

The indoor and outdoor temperature of the vehicle is detected by the indoor temperature sensor 4 and the outdoor temperature sensor 6. Whether or not the air conditioner is operated by the driver at a specific time point t2 according to the indoor and outdoor temperature of the sensed vehicle is collected as the air conditioner operation habit of the driver. With the repeated operation of the vehicle, whether or not the air conditioner operation of the driver corresponding to the indoor and outdoor temperature of the vehicle can be database-driven as the probability.

The minimum charge amount of the first battery 40 may be set as a first reference charge amount C if the outdoor temperature of the vehicle is less than the first reference temperature T1, be set as a second reference charge amount B if the outdoor temperature of the vehicle is lower than a first reference temperature T1 and lower than a second reference temperature T2 higher than the first reference temperature T1, and be set as a third reference charge amount A if the outdoor temperature of the vehicle is equal to or higher than the second reference temperature T2. At this time, the first reference charge amount C may be smaller than the second reference charge amount B, and the second reference charge amount B may be smaller than the third reference charge amount A.

That is, if the outdoor temperature of the vehicle is less than the first reference temperature T1, since the temperature inside the vehicle is low, the probability of operation of the air conditioner of the driver is low at a specific time t2. Accordingly, the surplus electric power to be converted from the first battery 40 to the second battery 60 at a specific time t2 is relatively small by setting the minimum charge amount of the first battery 40 as the first reference charge amount C.

If the outdoor temperature of the vehicle is equal to or higher than the second reference temperature T2, since the temperature inside the vehicle is high, the probability of operation of the air conditioner of the driver at the specific time t2 is high. Accordingly, Sufficient surplus power to be converted from the first battery 40 to the second battery 60 at a specific time point t2 is secured by setting the minimum charge amount of the first battery 40 as the third reference charge amount A.

If the outdoor temperature of the vehicle is more than the first reference temperature T1 and less than the second reference temperature T2, the minimum charge amount of the first battery 40 is set to the second reference charge amount B between the first reference charge amount C and the third reference charge amount A.

As described above, after completing learning the air conditioner operation habit database of the driver, charging and discharging of the first battery 40 is repeated by operating the MHSG 30 so that the charge amount of the first battery 40 is maintained at the set minimum charge amount or more S202. At this time, a charge amount of the first battery 40 and an indoor and outdoor temperature of the vehicle is detected S301, when the charge amount of the first battery 40 is discharged to the set minimum charge amount, the MHSG 30 is operated so that the charge amount of the first battery 40 becomes a maximum amount (full) S302.

After that, the MHSG 30 is operated to convert power from the first battery 40 to a second battery 60 to maintain enough voltage storage amount of the second battery S203. At this time, the power generated by the MHSG 30 is converted from the first battery 40 to the second battery 60 via a low voltage DC-DC converter (LDC) so that the charge amount of the second battery 60 is above a certain value. Then, the air conditioner 110 operates.

Referring to FIG. 5, the indoor and outdoor temperature of the vehicle and the air conditioner operation habit database of the driver are learned until the MHSG torque assist section t1. The time point t1 at which the driver completes learning the air conditioner operation habit database can be set to a time point at which the driver's air conditioner operation probability data is sufficiently collected with respect to the indoor and outdoor temperature of the vehicle in accordance with the repeated operation of the vehicle. Up to this point in time t1, the MHSG 30 can continuously perform engine torque assisting and sets a minimum charge amount of the first battery 40 of the mild hybrid electric vehicle up to this point.

The air conditioner operation timing t2 is predicted according to the air conditioner operation habit database of the learned, and after the driver completes learning the air conditioner operating habit database t1, the MHSG 30 is operated so that the charged amount of the first battery 40 is maintained at the set minimum charging amount until the predicted air conditioner operation time t2.

Referring to FIGS. 6A-6C, the minimum charge amount of the first battery 40 is set as a first reference charge amount C if the outdoor temperature of the vehicle is less than the first reference temperature T1 (FIG. 6C), the minimum charge amount of the first battery 40 is set as a second reference charge amount B if the outdoor temperature of the vehicle is more than a first reference temperature T1 and lower than a second reference temperature T2 higher than the first reference temperature T1 (FIG. 6B), and the minimum charge amount of the first battery 40 is set as a third reference charge amount A if the outdoor temperature of the vehicle is equal to or higher than the second reference temperature T2 (FIG. 6A). At this time, the first reference charge amount C is smaller than the second reference charge amount B, and the second reference charge amount B is smaller than the third reference charge amount A.

After the driver completes learning the air conditioner operating habit database t1, when the charging amount of the first battery 40 is discharged to the minimum charging amount by the predicted air conditioner operation time t2, the MHSG 30 is generated again to charge the first battery 40 to the maximum charging amount.

Like this, according to an exemplary embodiment of the present disclosure, the operation pattern of the air conditioner of the driver according to the indoor and outdoor temperature of the vehicle is learned, after the completion of the learning, the battery is charged according to the indoor and outdoor temperature of the vehicle and the operation pattern of the air conditioner of the driver, so that the charged amount of the battery is maintained at the minimum charging amount, and it is possible to prevent the insufficient battery power when the air conditioner is operated, therefore the indoor temperature of the vehicle is maintained comfortably.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

<Description of symbols>

| | |
|---|---|
| 10: engine | 20: transmission |
| 30: MHSG | 40: first battery |
| 50: LDC | 60: second battery |
| 70: vehicle electrical components | 80: differential gear device |
| 90: wheel | 100: controller |
| 110: air conditioner | |

What is claimed is:
1. A method for controlling a mild hybrid starter and generator (MHSG) for a torque assist and an air conditioner of a mild hybrid electric vehicle, comprising:

setting, by a controller, a minimum charge amount of a first battery of the mild hybrid electric vehicle based on an outdoor temperature of the vehicle;

repeating, by the controller, charging and discharging of the first battery by operating the MHSG so that the charge amount of the first battery is maintained at the set minimum charge amount or more; and operating, by the controller, the MHSG to convert power from the first battery to a second battery.

2. The method of claim 1, wherein:

in the setting of the minimum charge amount of the first battery, the minimum charge amount of the first battery is set by including a database of a driver's operating pattern of the air conditioner.

3. The method of claim 2, wherein:

the database of the driver's operating pattern of the air conditioner includes a probability of whether the driver operates the air conditioner at a specific time point.

4. The method of claim 1, wherein:

the setting of the minimum charge amount of the first battery includes an indoor temperature information of the vehicle, and the minimum charge amount of the first battery is set based on a difference between the outdoor temperature and the indoor temperature of the vehicle.

5. The method of claim 1, wherein:

the repeating of charging and discharging of the first battery includes:

detecting a charge amount of the first battery and the outdoor temperature of the vehicle; and operating the MHSG so that the charge amount of the first battery becomes a maximum amount when the charge amount of the first battery is discharged to the set minimum charge amount according to the outdoor temperature of the vehicle.

6. The method claim 1, wherein:

the setting of the minimum charge amount of the first battery includes:

setting the minimum charge amount of the first battery as a first reference charge amount when the outdoor temperature of the vehicle is less than a first reference temperature;

setting the minimum charge amount of the first battery as a second reference charge amount when the outdoor temperature of the vehicle is higher than the first reference temperature and lower than a second reference temperature that is higher than the first reference temperature; and setting the minimum charge amount of the first battery as a third reference charge amount when the outdoor temperature of the vehicle is equal to or higher than the second reference temperature.

7. The method of claim 6, wherein:

the first reference charge amount is smaller than the second reference charge amount, and the second reference charge amount is smaller than the third reference charge amount.

8. The method of claim 1, wherein:

the first battery is a 48V battery, and the second battery is a 12V battery.

9. The method of claim 1, wherein:

in the operating of the MHSG to convert the power from the first battery to the second battery, the power generated by the MHSG is converted from the first battery to the second battery via a low voltage DC-DC converter (LDC) so that a charge amount of the second battery is above a certain value.

10. An apparatus for controlling a mild hybrid starter & generator (MHSG) for a torque assist and an air conditioner of a mild hybrid electric vehicle, comprising:

a first battery charge amount detecting sensor for detecting a charge amount of a first battery;

an outdoor temperature sensor for detecting an outdoor temperature of the vehicle; and a controller for controlling the charge amount of the first battery and assisting an engine torque of the vehicle, wherein the controller is configured to:

set a minimum charge amount of the first battery based on the outdoor temperature of the vehicle;

operate the MHSG to repeatedly perform charging and discharging of the first battery so that the charge amount of the first battery is maintained at the set minimum charge amount or more; and operate the MHSG to convert power from the first battery to the second battery.

11. The apparatus of claim 10, wherein:

the controller is further configured to set the minimum charge amount of the first battery by including a database of a driver's operating pattern of the air conditioner.

12. The apparatus of claim 11, wherein:

the database of the driver's operating pattern of the air conditioner includes a probability of whether the driver operates the air conditioner at a specific time point.

13. The apparatus of claim 10, wherein:

the controller is further configured to:

acquire information on an indoor temperature of the vehicle from an indoor temperature sensor; and set the minimum charge amount of the first battery based on a difference between the outdoor temperature and the indoor temperature of the vehicle.

14. The apparatus of claim 10, wherein:

the controller is further configured to operate the MHSG so that the charge amount of the first battery becomes a maximum amount when the charge amount of the first battery is discharged to the set minimum charge amount according to the outdoor temperature of the vehicle.

15. The apparatus of claim 10, wherein:

the controller is further configured to:

set the minimum charge amount of the first battery as a first reference charge amount when the outdoor temperature of the vehicle is less than a first reference temperature;

set the minimum charge amount of the first battery as a second reference charge amount when the outdoor temperature of the vehicle is higher than the first reference temperature and lower than a second reference temperature that is higher than the first reference temperature; and set as a third reference charge amount when the outdoor temperature of the vehicle is equal to or higher than the second reference temperature.

16. The apparatus of claim 15, wherein:

the first reference charge amount is smaller than the second reference charge amount, and the second reference charge amount is smaller than the third reference charge amount.

17. The apparatus of claim 10, wherein:

the first battery is a 48V battery, and the second battery is a 12V battery.

18. The apparatus of claim 10, wherein:
the controller is further configured to
convert the power generated by the MHSG from the first battery to the second battery via a low voltage DC-DC converter (LDC) so that a charge amount of the second battery is above a certain value.

\* \* \* \* \*